(12) United States Patent
Park

(10) Patent No.: US 9,242,207 B2
(45) Date of Patent: Jan. 26, 2016

(54) VORTEX TUBE

(71) Applicant: KYUNGDO Co.,Ltd., Gimhae-si, Gyeongsangnam-do (KR)

(72) Inventor: Chun-bae Park, Gimhae-si (KR)

(73) Assignee: Kyungdo Co., Ltd (KR)

( * ) Notice: Subject to any disclaimer, the term of this patent is extended or adjusted under 35 U.S.C. 154(b) by 196 days.

(21) Appl. No.: 14/026,004

(22) Filed: Sep. 13, 2013

(65) Prior Publication Data

US 2014/0083063 A1     Mar. 27, 2014

(30) Foreign Application Priority Data

Sep. 26, 2012  (KR) .......... 10-2012-0107364

(51) Int. Cl.
| | | |
|---|---|---|
| *B01D 49/00* | (2006.01) |
| *B01D 53/24* | (2006.01) |
| *B01D 45/16* | (2006.01) |
| *B01D 45/08* | (2006.01) |
| *B01D 45/12* | (2006.01) |
| *F25B 9/04* | (2006.01) |
| *B01D 50/00* | (2006.01) |
| *A47L 9/16* | (2006.01) |

(52) U.S. Cl.
CPC ............... *B01D 53/24* (2013.01); *B01D 45/08* (2013.01); *B01D 45/12* (2013.01); *B01D 45/16* (2013.01); *F25B 9/04* (2013.01); *A47L 9/1608* (2013.01); *B01D 50/002* (2013.01)

(58) Field of Classification Search
CPC ........ B01D 45/16; B01D 45/08; B01D 45/12; F25B 9/04
USPC ........... 55/417, 413, 437, 418, 406, 394, 447, 55/459.1, 462, 337; 95/268, 271; 62/5
See application file for complete search history.

(56) References Cited

U.S. PATENT DOCUMENTS

| 2,790,310 A * | 4/1957 | Green ................................. 62/5 |
| 3,173,273 A * | 3/1965 | Fulton ................................. 62/5 |
| 2009/0255272 A1* | 10/2009 | Tibell ................................. 62/5 |

* cited by examiner

*Primary Examiner* — Dung H Bui
(74) *Attorney, Agent, or Firm* — Park & Associates IP Law, P.C.

(57) ABSTRACT

A vortex tube includes a main body, an inlet coupled to the main body and into which compressed air is introduced, an air circulating chamber installed in the main body, a passage channel through which the air introduced through the inlet passes forwards, a vortex generator configured to enable the air to spin in the air circulating chamber, a cold air-outlet through which cold air is discharged outside from the air circulating chamber, and a hot air-outlet through which hot air is discharged outside from the air circulating chamber.

5 Claims, 4 Drawing Sheets

VORTEX TUBE

REFERENCE TO RELATED APPLICATIONS

This application claims the priority benefit of Korean Patent Application No. 10-2012-0107364 filed on Sep. 26, 2012, the entire contents of which are incorporated herein by reference.

FIELD OF THE INVENTION

The present invention relates, in general, to a vortex tube which is able to improve air inflow.

BACKGROUND OF THE INVENTION

Generally, vortex tubes have been used for local cooling in industrial sites, and commonly used in industrial fields as with compressed air (i.e. a compressor) as a source of force energy.

Further, the vortex tube is a cooling device that simultaneously generates cool and hot air flow without using a mechanical drive and that is used in a manufacturing process in hot industrial sites, such as welding, melting, or the like.

A conventional vortex tube is disclosed in Korean Patent Application Nos. 10-2007-0025237 and 10-2008-0005461.

FIG. 1 is a cross-sectional view showing the structure of a conventional vortex tube.

As shown in FIG. 1, the vortex tube includes a main body 10 which has an inlet 15 into which compressed air is injected, a vortex generator 14 which is coupled to the main body 10 so as to generate cool and hot air, an air circulating tube 12 which is coupled to the vortex generator 14, a cover 13 which is coupled to the main body 10, and an adjusting valve 16 and a cap 17 which are coupled to the cover 13.

In the vortex tube, compressed air being injected into the inlet 15 is divided into cold air and hot air while passing though the vortex generator 14 and the air circulating tube 12 so that the hot air is discharged outside through a gap with the adjusting valve 16, which is disposed on one side of the air circulating tube 12 and the cold air is sprayed out through a front nozzle. Here, smooth discharge of the hot air allows improved efficiency of the vortex tube.

FIG. 2 is a conceptual view showing an air inflow in the vortex tube.

According to a vortex theory as shown in FIG. 2, when supplied to the vortex tube, the compressed air is sprayed perpendicular to the longitudinal direction of the vortex tube while being guided towards an inner side of a vortex spinning chamber via a nozzle.

The sprayed air forms a vortex such as whirlwind and spins round along an inner wall of the tube and moves to the end of the tube. Here, if a valve at an end of the tube opens a little, a portion of hot air is discharged outside and remaining air flows reversely along the center of the tube while forming a small vortex. The secondarily formed inner vortex loses its heat and is cooled, and is discharged outside via opposite end of the tube.

However, the vortex tube has problems in that hot air that spins externally increases temperature of the main body itself, giving a user burns.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art, and the present invention is intended to propose a vortex tube having a structure capable of solving the problems with the related art in which the main body is heated during the separation of hot and cold air.

In order to achieve the above object, according to one aspect of the present invention, there is provided a vortex tube including a main body, an inlet coupled to a back side of the main body and into which compressed air is introduced, an air circulating chamber in a type of hollow tube installed in the main body, a passage channel disposed between an inner surface of the main body and an outer surface of the air circulating chamber and through which the air introduced through the inlet passes forwards, a vortex generator coupled to a front side of the air circulating chamber so as to enable the air being introduced through the passage channel to spin in the air circulating chamber, a cold air-outlet coupled to a front side of the main body and through which cold air is discharged outside from the air circulating chamber, and a hot air-outlet coupled to a back side of the air circulating chamber and through which hot air is discharged outside from the air circulating chamber.

Further, the air circulating chamber may be provided on an outer surface on a front side thereof with a plurality of protrusions at regular angular intervals, wherein the compressed air passes through between the protrusions.

Further, the compressed air being introduced through the passage channel may cool the outer surface of the air circulating chamber.

Further, the hot air-outlet may be provided with a valve for regulating the amount of air to be discharged.

According to the present invention, the vortex tube is configured such that the inlet is installed at the back side of the main body so as to enable the compressed air to be introduced between the main body and the air circulating chamber so that the hot air is prevented from transferring heat to the main body, thereby solving the problems with the related art in which the main body is heated during the separation of air.

BRIEF DESCRIPTION OF THE DRAWINGS

The above and other objects, features and advantages of the present invention will be more clearly understood from the following detailed description when taken in conjunction with the accompanying drawings, in which.

DETAILED DESCRIPTION OF THE INVENTION

Figure 1:
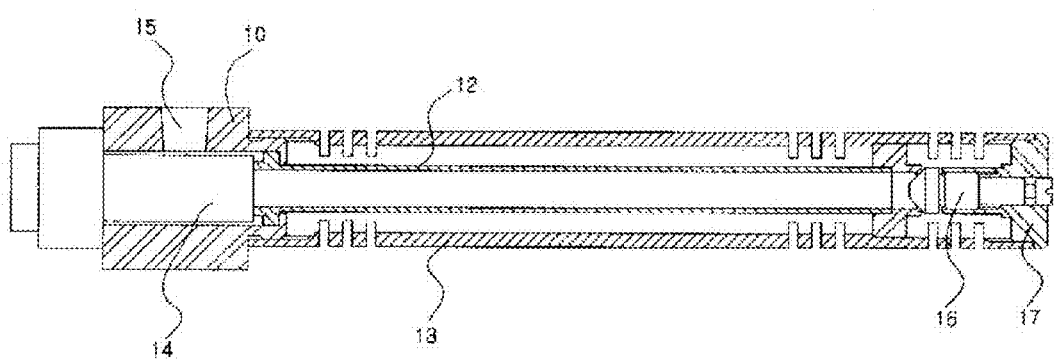
FIG. 1 is a cross-sectional view showing the structure of a conventional vortex tube.
Figure 2:
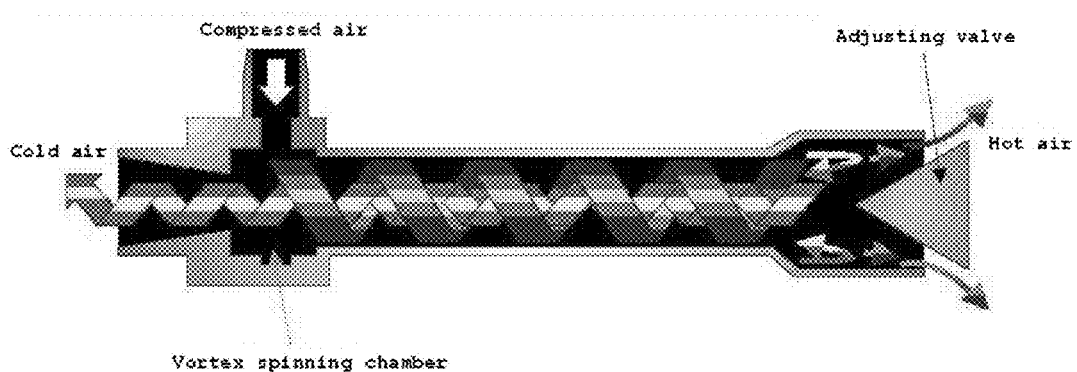
FIG. 2 is a conceptual view showing an air inflow in the vortex tube.

Reference will now be made in greater detail to a preferred embodiment of the invention, an example of which is illustrated in the accompanying drawings. Wherever possible, the same reference numerals will be used throughout the drawings and the description to refer to the same or like parts.

Figure 3:
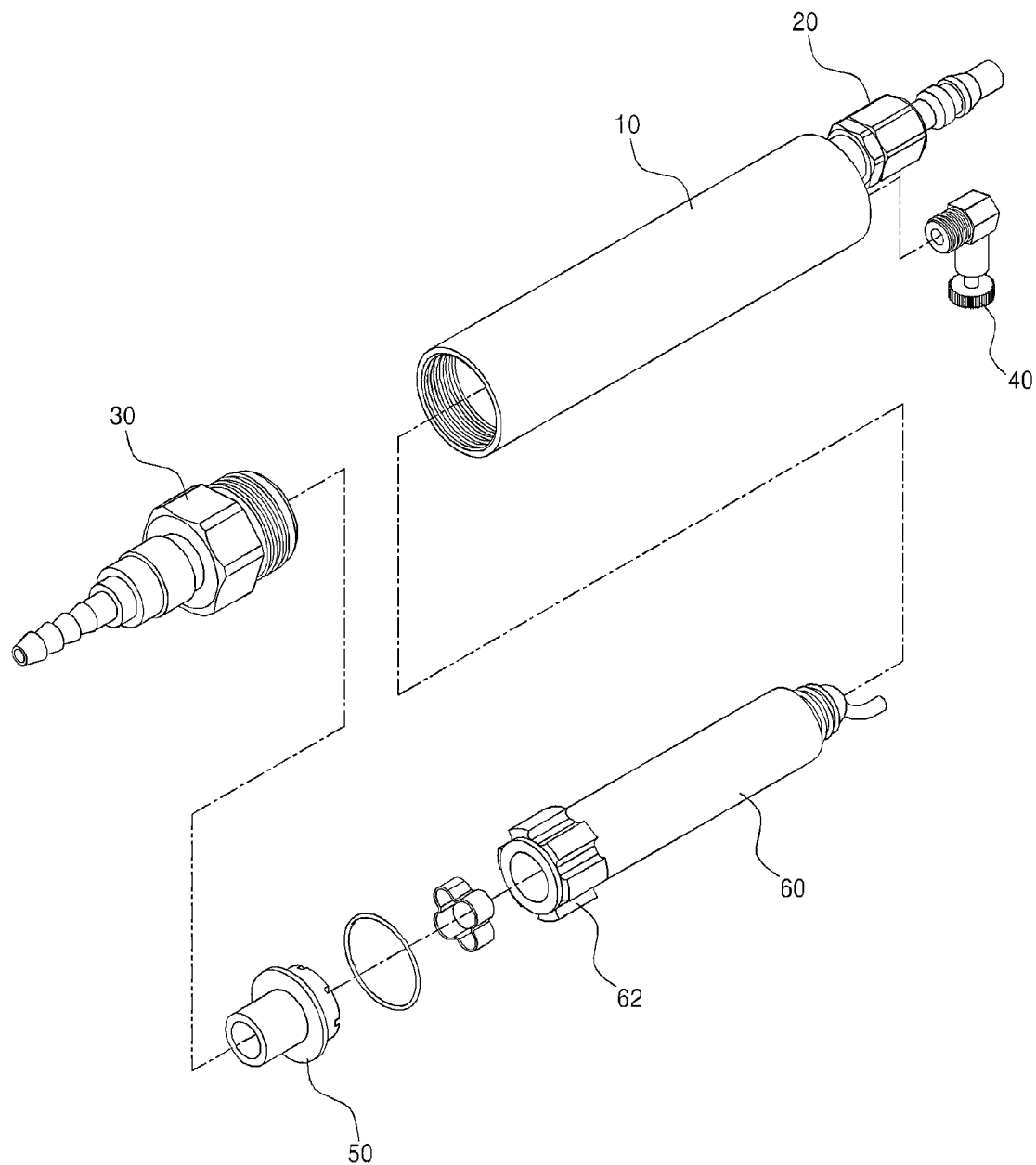
FIG. 3 is an exploded perspective view showing a vortex tube according to a preferred embodiment of the present invention.

FIG. 3 is an exploded perspective view showing a vortex tube according to a preferred embodiment of the present invention.

As shown in FIG. 3, the vortex tube includes a main body 10, an inlet 20, a passage channel 12, a cold air-outlet 30, a hot air-outlet 40, a vortex generator 50, and an air circulating chamber 60.

The main body 10 has a type of hollow tube and serves as a basic frame of the vortex tube.

The inlet 20 is connected with a compression tank (i.e. a compressor) in which compressed air is contained.

The vortex generator 50 causes the compressed air, which is introduced into the inlet 20 through the passage channel 12, to spin in a vortex in the air circulating chamber 60. Specifically, FIG. 4 is a conceptual view showing the vortex generator according to a preferred embodiment of the present invention.

Figure 4:
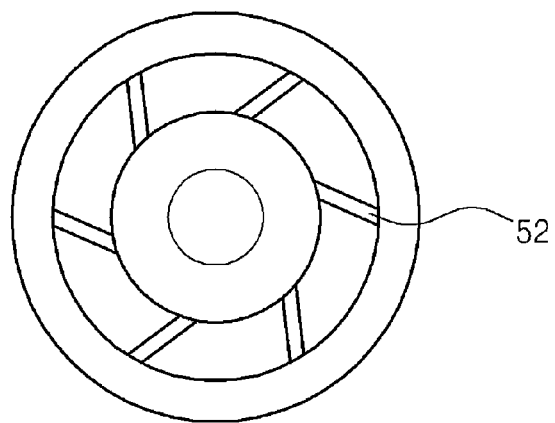
FIG. 4 is a conceptual view showing a vortex generator according to a preferred embodiment of the present invention.

As shown in FIG. 4, the vortex generator 50 is provided with a plurality of spinning passages 52 which extend from an outer surface towards an inner surface thereof at a certain inclined angle, thereby serving to allow the compressed air to spin therethrough.

The vortex generator 50 also has a central through hole through which air cooled in the air circulating chamber 60 is discharged forwards.

The air circulating chamber 60 is installed in the main body 10 such that the passage channel 12 for the air being introduced through the inlet 20 is formed. The air circulating chamber 60 has a type of hollow tube in which one side thereof opens and comes into close contact with the vortex generator 50 and a back side thereof is connected with the hot air-outlet 40.

That is, the air circulating chamber 60 is installed in the main body 10 such that the outer surface of the air circulating chamber 60 and the inner surface of the main body 10 are spaced by a certain distance so that the interspace becomes the passage channel 12.

The passage channel 12 not only serves as an air-passage channel, but also serves to cool the air circulating chamber 60.

The cold air-outlet 30 and the hot air-outlet 40 are coupled to front and back sides, respectively, of the main body 10, so that the cold air and the hot air from the air circulating chamber 60 are discharged therethrough.

Here, the hot air-outlet 40 is preferably coupled to the air circulating chamber 60 in an inclined state in one side such that the hot air-outlet does not interfere with the inlet 20 through which the compressed air is introduced.

Further, the air circulating chamber 60 is provided on an outer surface on a front side thereof with a plurality of protrusions 62 at regular angular intervals, wherein the compressed air passes through between the protrusions 62.

The compressed air becomes a laminar flow while passing through between the protrusions 62, and since the laminar flow spins at a certain angular speed in the vortex generator 50, heat exchange efficiency in the air circulating chamber 60 can be improved.

The operation of the vortex tube according to the present invention will be described in detail with reference to FIG. 5.

Figure 5:
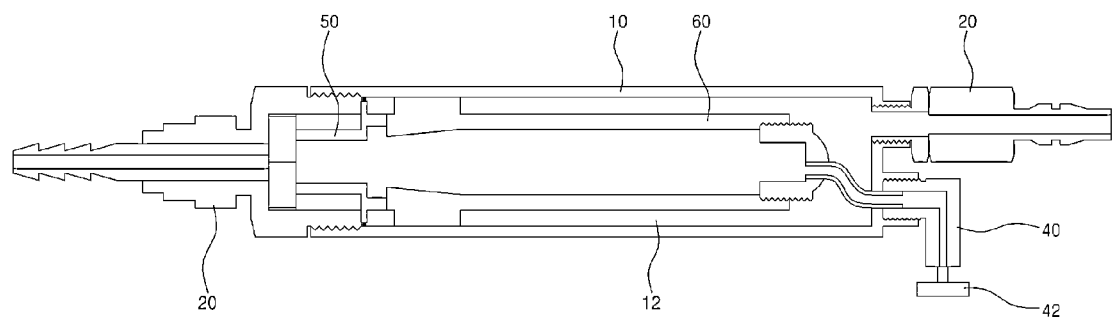
FIG. 5 is a cross-sectional view showing a vortex tube according to a preferred embodiment of the present invention.

FIG. 5 is a cross-sectional view showing the vortex tube according to a preferred embodiment of the present invention.

As shown in FIG. 5, the hot air-outlet 40 is provided with a valve 42 for regulating an amount of air to be discharged. Thus, the temperature of the cold air to be discharged through the cold air-outlet 30 can be regulated depending upon the amount of air to be discharged through the valve 42.

According to the present invention, the vortex tube is configured such that the passage channel 12 is disposed between the main body 10 and the air circulating chamber 60 and the compressed air is introduced through the passage channel 12, thereby fundamentally solving the problems with the related art in which the main body is heated by the hot air during a heat exchange process.

Figure 6:
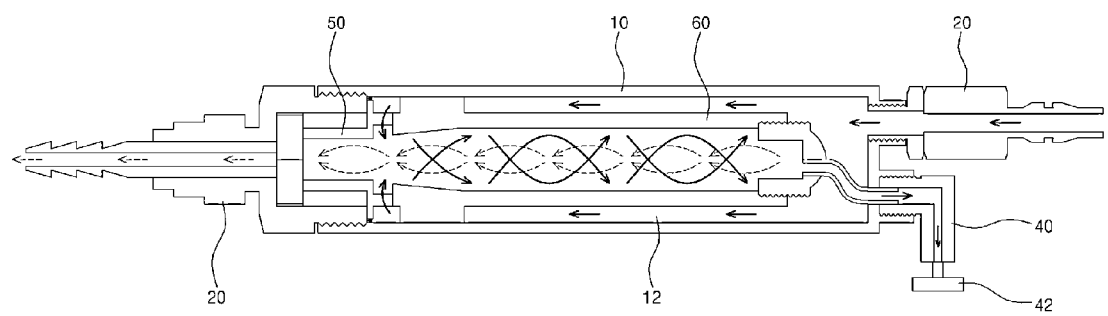
FIG. 6 is a view showing an air inflow in the vortex tube according to the preferred embodiment of the present invention.

FIG. 6 is a view showing an air inflow in the vortex tube according to the preferred embodiment of the present invention.

According to the vortex tube as shown in FIG. 6, when supplied through the inlet 20, the compressed air passes forwards through the passage channel 12.

Then, the compressed air spins through the vortex generator 50 and moves backwards while spinning in the air circulating chamber 60.

A portion of the air moving backwards in the air circulating chamber 60 is discharged outside through the hot air-outlet, and another portion of the air passes forwards through the center of the air circulating chamber 60 and then is discharged outside through the cold air-outlet 20.

That is, since the hot air moves in the air circulating chamber 60, heat is not transferred to the main body 10 which is disposed outside of the passage channel 12, thereby solving the problems in which the main body is heated.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A vortex tube comprising:
   a main body having a hollow tube shape with a cylindrical inner cavity defined in the main body;
   an inlet coupled to a back side of the main body and into which compressed air is configured to be introduced;
   an air circulating chamber having a hollow tube shape with a cylindrical inner cavity defined in the air circulating chamber, the air circulating chamber installed coaxially in the cylindrical inner cavity of the main body and having an outer passage channel of annular shape defined between a cylindrical inner surface of the main body and a cylindrical outer surface of the air circulating chamber for allowing passage of compressed air through the outer passage channel;
   a vortex generator coupled to a front side of the air circulating chamber so as to enable the compressed air introduced through the outer passage channel to spin and move backwardly into the cylindrical inner cavity of the air circulating chamber;
   a cold air-outlet coupled to a front side of the main body and through which cold air is configured to be discharged outside from the cylindrical inner cavity of the air circulating chamber; and
   a hot air-outlet coupled to a back side of the air circulating chamber and through which hot air is configured to be discharged outside from the cylindrical inner cavity of the air circulating chamber.

2. The vortex tube according to claim 1, wherein the air circulating chamber includes a plurality of protrusions formed, at regular angular intervals, at an outer surface on a front side of the air circulating chamber, wherein the compressed air is configured to pass through the space between the protrusions.

3. The vortex tube according to claim 1, wherein the compressed air introduced through the outer passage channel cools the outer surface of the air circulating chamber.

4. The vortex tube according to claim 1, wherein the hot air-outlet is provided with a valve for regulating an amount of air to be discharged.

5. The vortex tube according to claim 1, wherein the vortex generator has a hollow tube shape with a plurality of spinning passages configured to allow the compressed air introduced through the outer passage channel to spin and move backwardly into the cylindrical inner cavity of the air circulating chamber.

* * * * *